C. W. LARSON.
ELECTRIC LOCOMOTIVE.
APPLICATION FILED APR. 6, 1916.
1,221,753.
Patented Apr. 3, 1917.
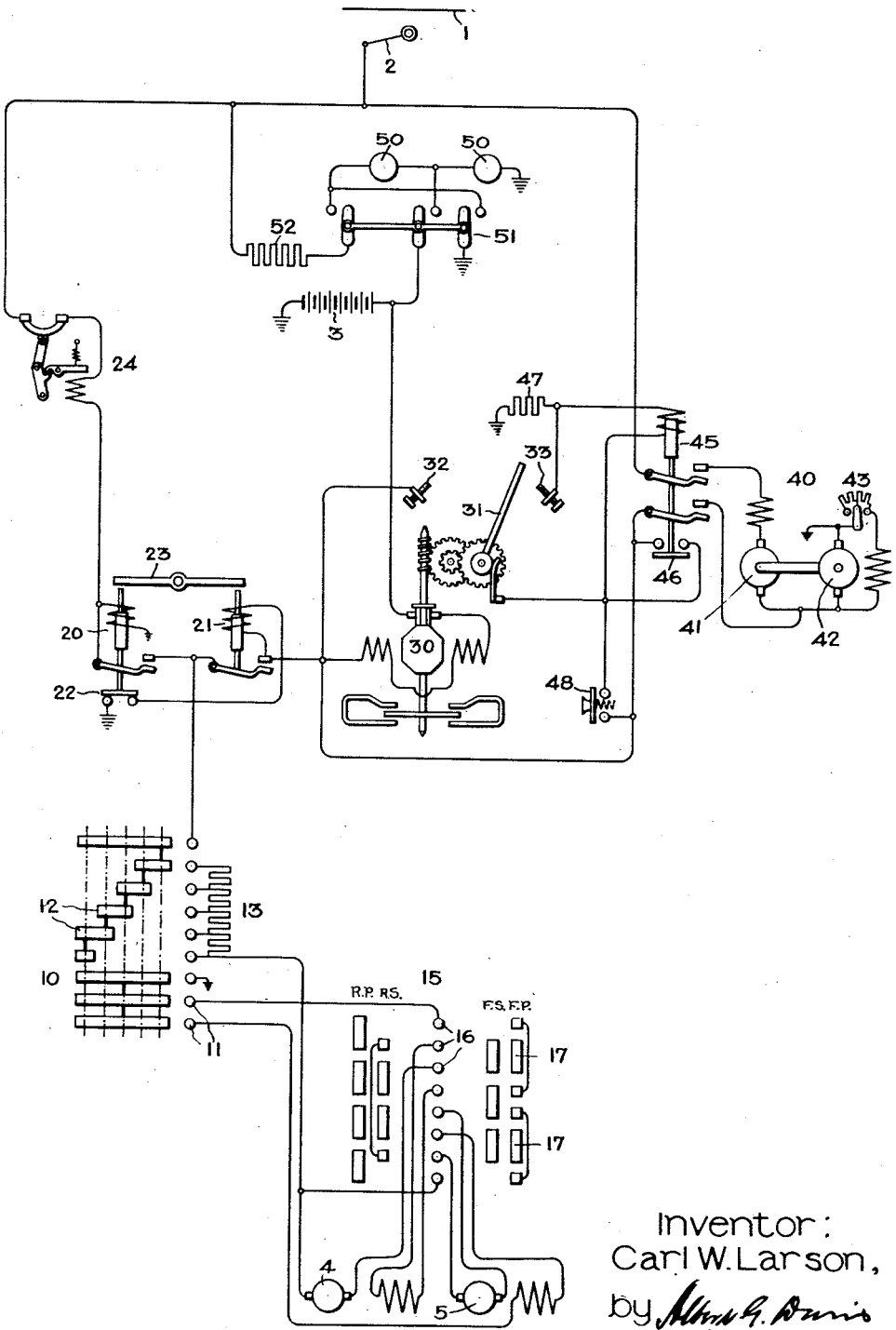
Inventor:
Carl W. Larson,
by Albert G. Davis
His Attorney.

UNITED STATES PATENT OFFICE.

CARL W. LARSON, OF ERIE, PENNSYLVANIA, ASSIGNOR TO GENERAL ELECTRIC COMPANY, A CORPORATION OF NEW YORK.

ELECTRIC LOCOMOTIVE.

1,221,753.   Specification of Letters Patent.   Patented Apr. 3, 1917.

Application filed April 6, 1916. Serial No. 89,339.

*To all whom it may concern:*

Be it known that I, CARL W. LARSON, a citizen of the United States, residing at Erie, in the county of Erie, State of Pennsylvania, have invented certain new and useful Improvements in Electric Locomotives, of which the following is a specification.

My invention relates to electric locomotives and especially to that type in which the locomotive may be supplied with current either from a storage battery or a trolley.

In certain cases it is desirable to be able to run a locomotive, normally supplied with current from a trolley, beyond the limits of the trolley system and, to this end, a storage battery may be provided upon the locomotive. Now the voltage of this battery may not be as high as that of the trolley system and, if this is the case, then some means must be provided for charging the battery and also some means to prevent the battery from supplying the motors at the same time as they are being supplied from the trolley in order that the battery may not be thrown directly in parallel with the higher voltage source of supply.

Accordingly, my invention provides an improved arrangement of a locomotive of this type such that the desired operations may be performed automatically.

For a fuller understanding of my invention, reference may be had to the following description taken in connection with the accompanying drawing, in which the single figure is a diagrammatic view of the apparatus and control circuits employed.

In the drawing I have indicated a trolley wire 1 with which the trolley pole 2 coöperates to furnish a supply of power to the locomotive. When the locomotive is operated beyond the limits of the trolley wire, the storage battery 3 furnishes power to the locomotive. The latter is propelled by means of series traction motors 4 and 5 which may be controlled in any suitable manner. For the sake of illustration I have shown a main controller 10 comprising fixed contacts 11 and coöperating moving contacts 12 by means of which the motors may be connected across the source of power and the starting resistance 13 controlled. Supplementing this main controller is a reverser 15 comprising fixed contacts 16, and coöperating moving contacts 17. This reverser is adapted to be set in any one of four positions. Two of these are designated by the letters RP and RS indicating the positions for operation in the reverse direction with the motors connected in parallel and series, respectively. The other two positions are designated by the letters FS and FP, and indicate the positions for operation in the forward direction with motors connected in series and parallel, respectively.

In order to connect the traction motors to a source of supply and prevent simultaneous connection to both sources, I provide electromagnetic switches 20 and 21, of which 20 is provided with an interlocking switch 22 included in the circuit of the winding of the switch 21. The two switches are also interlocked mechanically in any suitable manner, as indicated diagrammatically at 23. Interposed between the trolley 2 and the switch 20 is the customary overload circuit breaker 24. It will be seen by inspection of the drawing that if power is supplied to the trolley 2, the winding of the switch 20 will be energized and the motors connected to the trolley through the controller 10. When the switch 20 is closed, the winding of the switch 21 will first be deënergized by the interlock switch 22, and at the same time the switch 21 will be forced open mechanically by means of the mechanical interlock 23. The winding of the switch 21 is connected directly to one side of the storage battery through the ampere hour meter 30. The showing of this meter is purely diagrammatic and it will be understood that any of the well known commercial forms of ampere hour meter may be substituted therefor. Mechanically connected to the moving part of the meter by means of a worm and gearing is a moving arm 31 adapted to contact with either of the adjustable fixed contacts 32 and 33. The moving contact arm 31 will contact with the contact 32 when the storage battery 3 is discharged to the lowest amount which is desirable in practice. On the other hand when the storage battery has been charged sufficiently, the moving arm 31 will contact with fixed contact 33.

When the voltage of the storage battery is considerably less than that of the trolley system, then some voltage reducing means must be interposed between the two, such as the motor generator set 40 in which a series motor 41 is arranged to drive a shunt generator 42. Any suitable means such as the rheostat 43 will be provided for adjusting the voltage of the generator. A control contactor 45 is arranged to connect the motor generator set to the trolley and to the storage battery by its upper and lower contact arms, respectively. This contactor is also provided with an interlocking switch 46 which provides a holding-in circuit for its operating coil. A ground connection 47 through a suitable resistance is provided for one side of the actuating winding of contactor 45, and in order that the contactor may be closed at the will of the operator push-button 48 is provided.

Owing to the difference in potential between the trolley system and the battery some arrangement must be provided whereby lights upon the locomotive, such, for example, as head lights 50, may be supplied from either of the two sources. To this end switch 51 is so arranged that the lights may be connected in series through a suitable resistance 52 to the trolley, or they may be connected in parallel directly across the storage battery.

If the locomotive is operating within the limits of the trolley wire 1 it will then be seen that the switch 20 will be closed and the operator by proper manipulation of the controller 10 or reverser 15 can control the traction motors in the usual manner. If, however, the source of supply for the trolley wire fails and he desires to operate the locomotive beyond the limits of the same, then switch 21 will be immediately energized by the closing of the interlock switch 22, thereby connecting the controller to the storage battery. All current supplied to or taken from the storage battery must flow through the ampere hour meter 30. As a result, when the storage battery has become discharged to the degree indicated by the setting of the fixed contact 32, a circuit will be established by the moving arm 31, whereby the contactor 45 will be energized from the battery through the contact 32, the arm 31 and the ground connection 47. If, now, a supply of power is available from the trolley, the motor generator set will start up and its generator 42 will supply power through the lower contact of the contactor 45 and through the ampere hour meter 30 to the storage battery. This charging current will set the ampere hour meter rotating in the opposite direction so that its arm 31 will be drawn away from the contact 32. Owing to the provision of the interlock switch 46, however, a parallel circuit for energizing the winding of contactor 45 has been established and the opening of the original energizing circuit will have no effect. When the storage battery becomes sufficiently charged the moving arm 31 will come in contact with the fixed contact 33 thereby short-circuiting the winding of contactor 45 and disconnecting the motor generator set from the trolley and from the storage battery.

It will therefore be seen that I have provided an arrangement wherein two sources of power are provided and the traction motors are automatically connected to one or the other source without attention from the operator and without danger that the two sources will be thrown in parallel. Furthermore I have provided an arrangement whereby the storage battery constituting one of the sources may be charged automatically through a voltage reducing means without attention from the operator. Although I have illustrated and described herein only one particular arrangement of my invention, I seek to cover in the appended claims all of those modifications and variations which come within the scope of my invention.

What I claim as new and desire to secure by Letters Patent of the United States, is:—

1. An electric locomotive, comprising a trolley, a storage battery, a traction motor, switches for connecting said motor to the trolley and the storage battery, means for preventing simultaneous closure of said switches, a voltage reducing means, a connecting device for connecting said reducing means to said trolley and said battery, and means responsive to the electrical condition of said battery controlling said latter connecting device.

2. An electric locomotive comprising a trolley, a storage battery, a traction motor, an electromagnetic switch responsive to the trolley voltage for connecting the motor to the trolley, an electromagnetic switch arranged to be energized from the battery by the opening of said first mentioned switch, to thereby connect the motor to the battery, a motor generator set, means for connecting the same between the trolley and the battery to deliver current to the battery at a reduced voltage, and an ampere hour meter in circuit with said battery controlling said connecting means.

3. An electric locomotive comprising a trolley, a storage battery, a traction motor, means for connecting said motor to either said battery or said trolley, a motor generator set adapted to be connected between said trolley and said battery to charge the latter when said traction motor is being supplied from said trolley and an ampere hour meter arranged to control the connection of said motor generator set to the trolley and battery.

In witness whereof, I have hereunto set my hand this fourth day of April, 1916.

CARL W. LARSON.